(12) United States Patent
Meyer et al.

(10) Patent No.: US 7,130,468 B1
(45) Date of Patent: Oct. 31, 2006

(54) METHOD FOR IDENTIFYING CHANGE OF SCENERY AND CORRESPONDING MONITORING DEVICE

(75) Inventors: Michael Meyer, Sibbesse (DE); Michael Hoetter, Gehrden (DE); Jens Dreves, Munich (DE)

(73) Assignee: Robert Bosch GmbH, Stuttgart (DE)

( * ) Notice: Subject to any disclaimer, the term of this patent is extended or adjusted under 35 U.S.C. 154(b) by 736 days.

(21) Appl. No.: 10/030,832

(22) PCT Filed: Jul. 11, 2000

(86) PCT No.: PCT/DE00/02250

§ 371 (c)(1),
(2), (4) Date: Apr. 11, 2002

(87) PCT Pub. No.: WO01/06471

PCT Pub. Date: Jan. 25, 2001

(30) Foreign Application Priority Data

Jul. 15, 1999 (DE) ................. 199 32 662

(51) Int. Cl.
*G06K 9/68* (2006.01)
(52) U.S. Cl. ............... 382/219; 382/199; 340/541; 348/152
(58) Field of Classification Search ......... 382/103, 382/104, 199, 209, 218–220, 208, 305, 278; 340/541, 937, 938; 348/143, 152–155
See application file for complete search history.

(56) References Cited

U.S. PATENT DOCUMENTS

| | | | | |
|---|---|---|---|---|
| 4,236,180 A | * | 11/1980 | Cayzac | ................. 348/154 |
| 4,679,077 A | | 7/1987 | Yuasa et al. | |
| 4,783,833 A | | 11/1988 | Kawabata et al. | |
| 5,453,733 A | * | 9/1995 | Peterson et al. | ............ 340/567 |
| 5,455,561 A | * | 10/1995 | Brown | ................. 340/541 |
| 5,745,160 A | * | 4/1998 | Ishida et al. | ............ 348/14.09 |
| 6,463,432 B1 | * | 10/2002 | Murakawa | ................. 707/5 |
| 6,507,660 B1 | * | 1/2003 | Wirtz et al. | ................. 382/103 |
| 6,509,835 B1 | * | 1/2003 | Krubiner et al. | ............ 340/554 |

FOREIGN PATENT DOCUMENTS

| | | | |
|---|---|---|---|
| DE | 196 03 935 A | | 8/1997 |
| GB | 2150724 A | * | 7/1985 |
| JP | 04266192 A | * | 9/1992 |

OTHER PUBLICATIONS

Gavrila et al. (<< Fast Correlation Matching in Large (Edge) Image Databases >>, SPIE vol. 2368 Image and Information Systems (1994), pp. 104-116).*
Gonzalez et al. (Digital Image Processing, 1st ed., 1993, pp. 583-585).*
Bronstein-Semendjajew, Taschenbuch Der Matematik, Verlag Harri Deutsch, Thun, 24. Auflage, 1989, Formel (5.92), p. 692.
"Gefahrenmeldesysteme, Technik Und Strikturen", Von Harald Fuhrmann, Heuttig-Verlag Heidelberg, 1992, ISBN 3-7785-2185-3, pp. 82-83.

* cited by examiner

*Primary Examiner*—Jingge Wu
*Assistant Examiner*—Yubin Hung
(74) *Attorney, Agent, or Firm*—Michael J. Striker

(57) ABSTRACT

A method for detecting changes in a viewfield observed by a stationary image capturing device is proposed, in which edge images are calculated and are compared to edge images of reference recordings in order to detect static changes within the observed image range that are independent of image brightness.

7 Claims, 4 Drawing Sheets

METHOD FOR IDENTIFYING CHANGE OF SCENERY AND CORRESPONDING MONITORING DEVICE

BACKGROUND OF THE INVENTION

1. Field of the Invention

The invention relates to methods and systems for monitoring a scene to detect changes, especially changes that indicate a theft of an object.

2. Description of Related Art

The publication "Gefahrenmeldesysteme, Technik und Strukturen" {Danger Alert Systems, Technology and Structures} by Harald Fuhrmann, Hüttig-Verlag, Heidelberg, 1992, ISBN 3-7785-2185-3, pp. 82–83, has already disclosed comparing a reference image of a view field with a current image so that changes in the current image in relation to the reference image cause an alarm to be triggered; in order to detect differences, a gray value comparison is executed.

SUMMARY OF THE INVENTION

It is an object of the present invention to provide a method and a system for monitoring a scene to detect changes, especially theft of objects or dangerous conditions, in which changes in illumination and brightness do not affect the results.

According to the invention the method for monitoring a scene to detect a change includes the steps of:
  a) establishing an edge image and a reference edge image based on a reference image and a current image detected in a view field of a stationary image capturing device;
  b) calculating a correlation value for at least one region of the edge image and a corresponding partial image of the reference edge image;
  c) identifying a change of the at least one region when the correlation value falls below a threshold value; and
  d) outputting an alarm when the at least one region is identified as changed for a predetermined time interval longer than a corresponding time interval that the edge image is detected to be changed.

The method and monitoring system according to the invention, with the characterizing features of the independent claims, have the advantage over the prior art that when people who remain in a predetermined scene for an unusual length of time are detected, when objects that are placed in a predetermined scene are detected, or when a theft of objects from a predetermined scene is detected, that is, when static changes in a predetermined viewfield are detected, then disturbance variables can be deliberately permitted. Because the image signal is not directly evaluated, i.e. the gray value or color value of the camera image, but rather the structure data contained in a camera image is evaluated; brightness changes and different illuminations of the scene are essentially not taken into account in the calculation of the detection result.

Advantageous modifications and improvements of the method and monitoring system disclosed in the independent claims are possible by means of the steps taken in the dependent claims. It is particularly advantageous to compare the chronological course of the change in a region of interest with the chronological course of a change in the overall image so that long-term changes of the region can be reliably detected; the required time phases of the change can be predetermined as a function of the individual intended use. Temporary changes, such as the short-term obstruction of a camera by a person, an insect sitting on the lens of the monitoring camera, or the like, are thus reliably detected as such and do not cause the alarm to be triggered.

Taking into account an additional predetermined time assures that unusual blockages of the camera, such as its being covered by a cloth, can be distinguished from other changes in the scene in order to trigger an alarm.

The use of the average, quadratic deviation of current images turns out to be an advantageously simple possibility for executing a significance test while taking into account image noise and for simultaneously producing a feature for detecting changes, which is reliable in actual practice, so that those changes are also registered, which have not yet by themselves led to classification of the region as a changed region solely based on the correlation consideration. Another improvement of the significance test is achieved in that if there is no change in the scene, the threshold for the detection is adaptively tracked on a continuing basis by means of a measurement of the current image noise. This property on the one hand permits the use of different cameras for capturing images by virtue of the fact that properties of the camera that are important for the detection are automatically and therefore independently detected and measured; on the other hand, changes in the camera during operation, e.g. when there are different lighting conditions and equipment aging conditions, these changes are taken into consideration and correspondingly compensated for.

BRIEF DESCRIPTION OF THE DRAWINGS

Exemplary embodiments of the invention are shown in the drawings and will be explained in detail in the description that follows.

DESCRIPTION OF THE PREFERRED EMBODIMENTS

Figure 1:
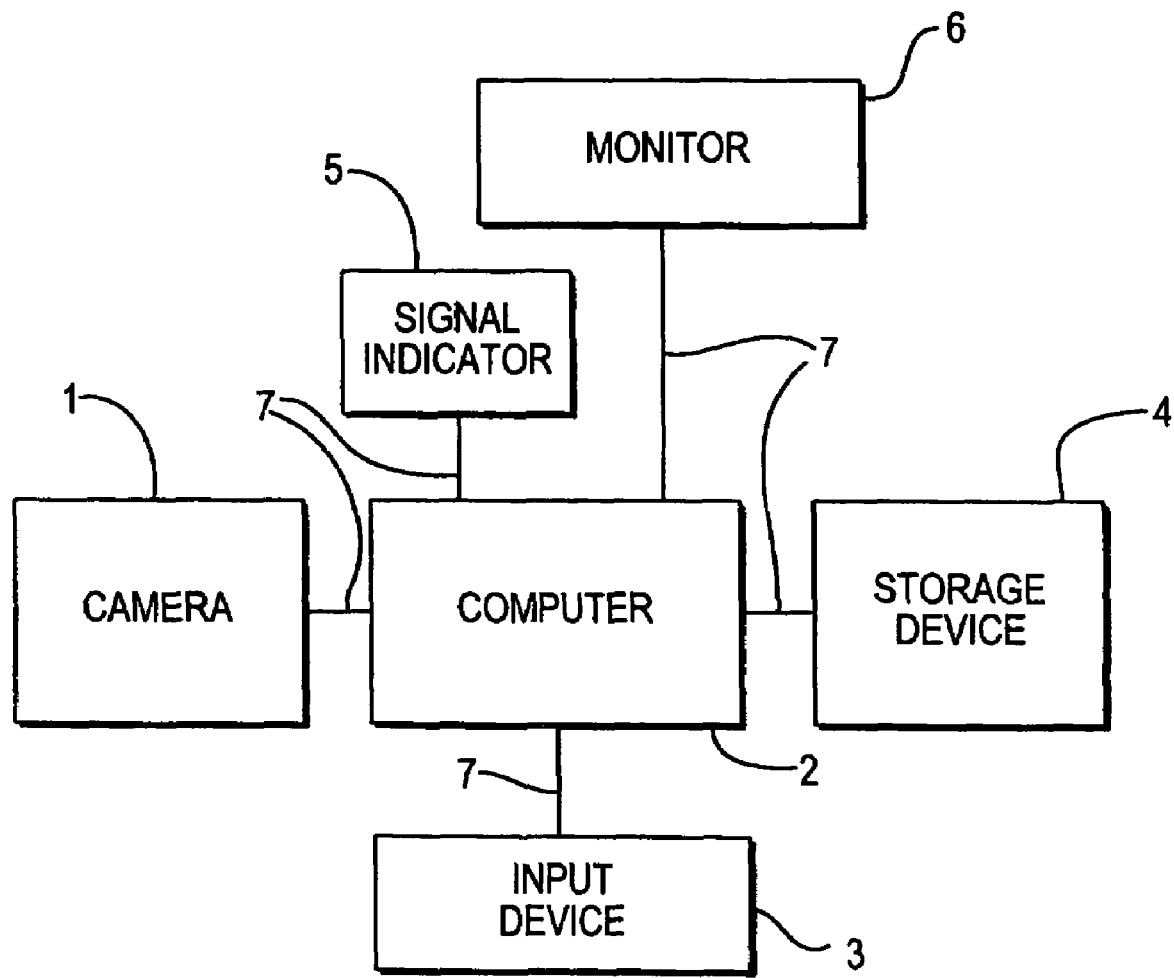
FIG. 1 shows a monitoring system in accordance with the present invention.

FIG. 1 shows a monitoring system with a camera 1, a computer 2, an input device 3, a storage device 4, a signal indicator 5, and a monitor 6; the camera 1, the input device 3, the storage device 4, the monitor 6, and the signal indicator 5 are connected to the computer 2 via connecting lines 7.

The camera 1 is aimed at a predetermined viewfield to be monitored. The stationary camera supplies image data to the computer 2, which executes a video-based detection of static scene changes, as described in FIGS. 2, 3, and 4. The memory is used to store reference images so that the current image data can be compared to the stored reference image. The monitor 6 displays a picture of the viewfield captured by the camera 1. The signal indicator 5 indicates a static change of the scene in the viewfield, for example by means of an acoustic or optical warning signal. The signal indicator here can be integrated into the monitor, i.e. an optical display can take place in a partial region of the monitor; in addition, an alarm tone can be output by its speakers or by separately mounted speakers. The input device 3 is used to select regions of interest in the viewfield that are especially tested for static changes. Furthermore, the input device can be used to input times T1 and T2 which depending on the intended use, determine the duration of a change which should lead to the triggering of an alarm. In this connection, the longer time T2 is used for the detection of unusually long changes, for example when the camera is covered or during long-duration manipulations of persons committing illegal acts in the viewfield. On the other hand, the time T1 is used to distinguish short-term changes in a large part of the viewfield from a change in a region of interest. The times T1 and T2 and the selection of the regions are also stored in the memory 4 in the same way as the reference image.

Figure 2:
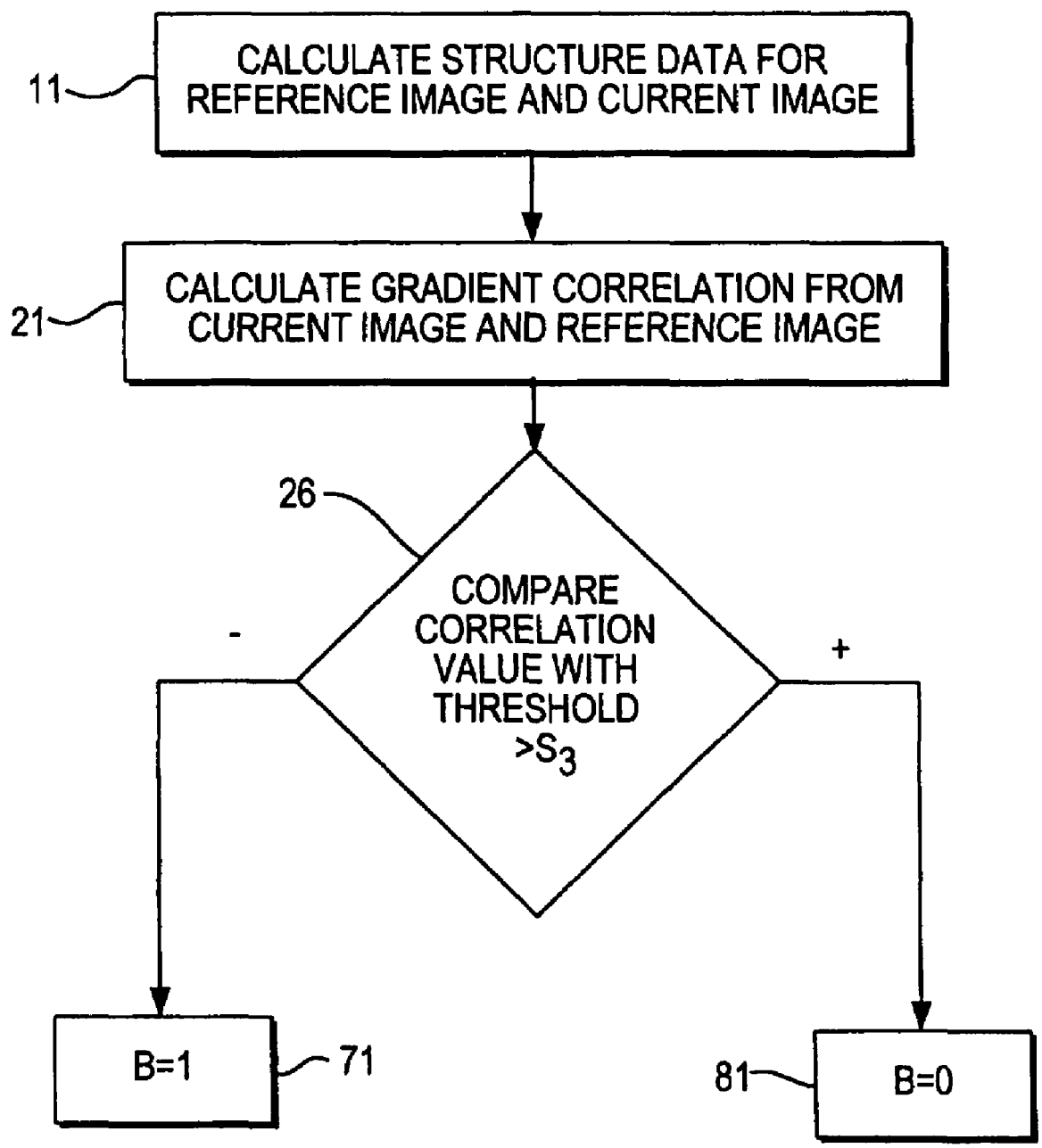
FIG. 2 shows a flowchart for a method sequence of an image processing in accordance with the present invention.

FIG. 2 shows a flowchart for the method sequence of the image processing. A stationary camera captures continuous images of a predetermined viewfield in which possible changes are to be detected. Before the system is placed into operation, a reference image of the scene is captured and stored in a memory. With continuous monitoring, the current images of the viewfield are compared to the reference image. To this end, in process step 11, the structure data are calculated for both the reference image and the current image by virtue of the fact that the gradient of the brightness value and/or the color value in the horizontal direction and vertical direction of the two-dimensional pictures are detected and along with them, the edge data or the data relating to jumps in the gray value or color value in the viewfield. Then in process step 21, the correlation of the gradients, which are referred to below as edge images, is calculated from the current image and the reference image. In this connection, a correlation coefficient r is calculated according to the Bronstein-Semendjajew "Taschenbuch der Mathematik" [Pocket Edition of Mathematics], Verlag Harri Deutsch, Thun, 24$^{th}$ edition, 1989, formula (5.92), p. 692:

$$r(\Sigma(xn-x)(yn-y))/\sqrt{(\Sigma(xn-x)^2\Sigma(yn-y)^2)}.$$

In this equation, xn is the gradient at the position n in the reference image, yn is the gradient at the position n in the current image, x is the average of the gradients in the reference image, y is the average of the gradients in the current image, and n is the numbering index of the image positions which is expressed in natural numbers, for example. The summations are executed via the gradients xn and yn in both spatial dimensions of the regions to be evaluated. The correlation coefficient has a value range from −1 to 1. The value 1 here indicates the existence of an identical structure, the value 0 indicates that no correlation exists, i.e. a total change of the current image in comparison to the reference image. A value <0 indicates an inverse proportion and is likewise to be taken as a total change. In step 26, the correlation value thus determined is compared to a threshold S3 (e.g. S3=0.3). If the correlation value is greater than the threshold, then in step 81, the image is judged to be unchanged (B=0). Otherwise, the image is identified as changed in relation to the reference image (step 71, B=1).

In this evaluation, the image signal is not tested directly, but the structure data calculated from the image is tested for similarity. By using correlation of the structural features, changes between the reference image and the current image which are caused by image brightness and contrast can be taken into account, i.e. even when the two images differ in these parameters, but have similar structures at identical image positions, the evaluation of the correlation results in a large similarity measurement.

Before the monitoring is started, regions of interest are established in the viewfield to be monitored. These parts of the image, which are referred to below as regions, as well as the overall image, are subjected to a correlation consideration each time the new image is processed. To this end, in process step 10, the edge image belonging to the region is separated from the edge image obtained to in the process step 11 of FIG. 2 and in process step 20, the correlation value of the regional edge image with the corresponding partial image of the edge image of the reference image is calculated. In step 25, the correlation value of the region under consideration is compared to a threshold S1 (e.g. S=0.5). If the correlation value lies below this threshold, then in step 70, the relevant region i is detected as changed (R(i)=1). By contrast, if the correlation value exceeds the threshold S1, then the similarity of the region to the corresponding partial region of the reference image is tested further. To this end, in process step 30, the change in image brightness and image contrast of the region in the current image in comparison to the reference image is calculated. Then in process step 40, the structural deviation is calculated. The average quadratic deviation of the edge image of the current image from the edge image of the reference image in the region is determined pixel by pixel. The resulting numerical value is then corrected with regard to image brightness and image contrast. In a statistical significance test 45, a check is made as to whether the remaining change was caused by image noise. In this connection, a numerical value is established which evaluates the change in comparison to image noise. A numerical value of 1 here signifies that the change corresponds precisely to what is to be expected due to image noise. A numerical value of >1 signifies that the change greater that what is to be expected due to image noise. The determined numerical value is compared to a threshold S2 (e.g. S2=5). If the numerical value is greater than the threshold S2, then the region is identified as changed (process step 70). Otherwise, no change is detected (process step 80): R(i)=0. Before step 80 in this case, the image noise in the region is computed again (process step 60) in order to be able to use a current computation in chronologically subsequent evaluations. In this case, a value for the image noise is measured in the region identified as unchanged. The value to be used in a subsequent significance test is determined in a recursive filter: A(t+1)=RE*A(t)+(1−RE)*B(t). In this equation, A(t) is the assumed value of the image noise at time t, which was used in the significance test, A(t+1) is the assumed value of the image noise at time t+1, which should be used as a new computed value for the next image, B(t) is the value of the image noise measured at time t; RE is a recursion factor (0<RE<1), e.g. RE=0.9. The value A(0) at the beginning of the monitoring process is a heuristically selected initial value.

Figure 3:
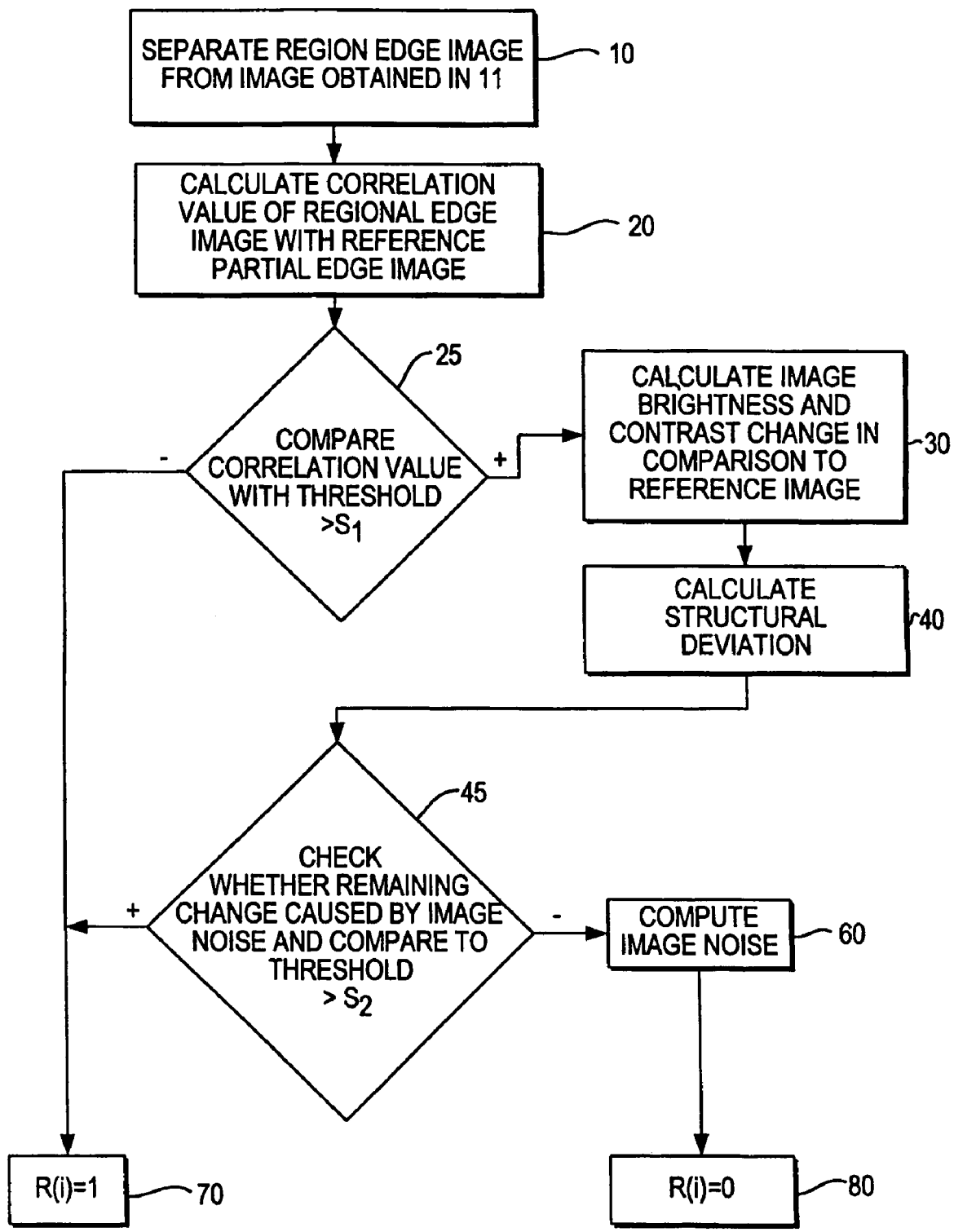
FIG. 3 shows another flowchart of a region-oriented structure data analysis in accordance with the present invention.

The region-oriented structure data analysis described in FIG. 3 is executed for each region selected at the start of the monitoring process and thus for each selected region, supplies the binary status datum "region changed" or "region unchanged". The process steps 30, 40, 45, and 60 assure a reliable identification of changes even if a global structural comparison essentially independent of brightness fluctuations has not yet led to the identification of a change. The values for B and R(i) are supplied to the subsequent evaluation (see FIG. 4) for the alarm triggering.

Figure 4:
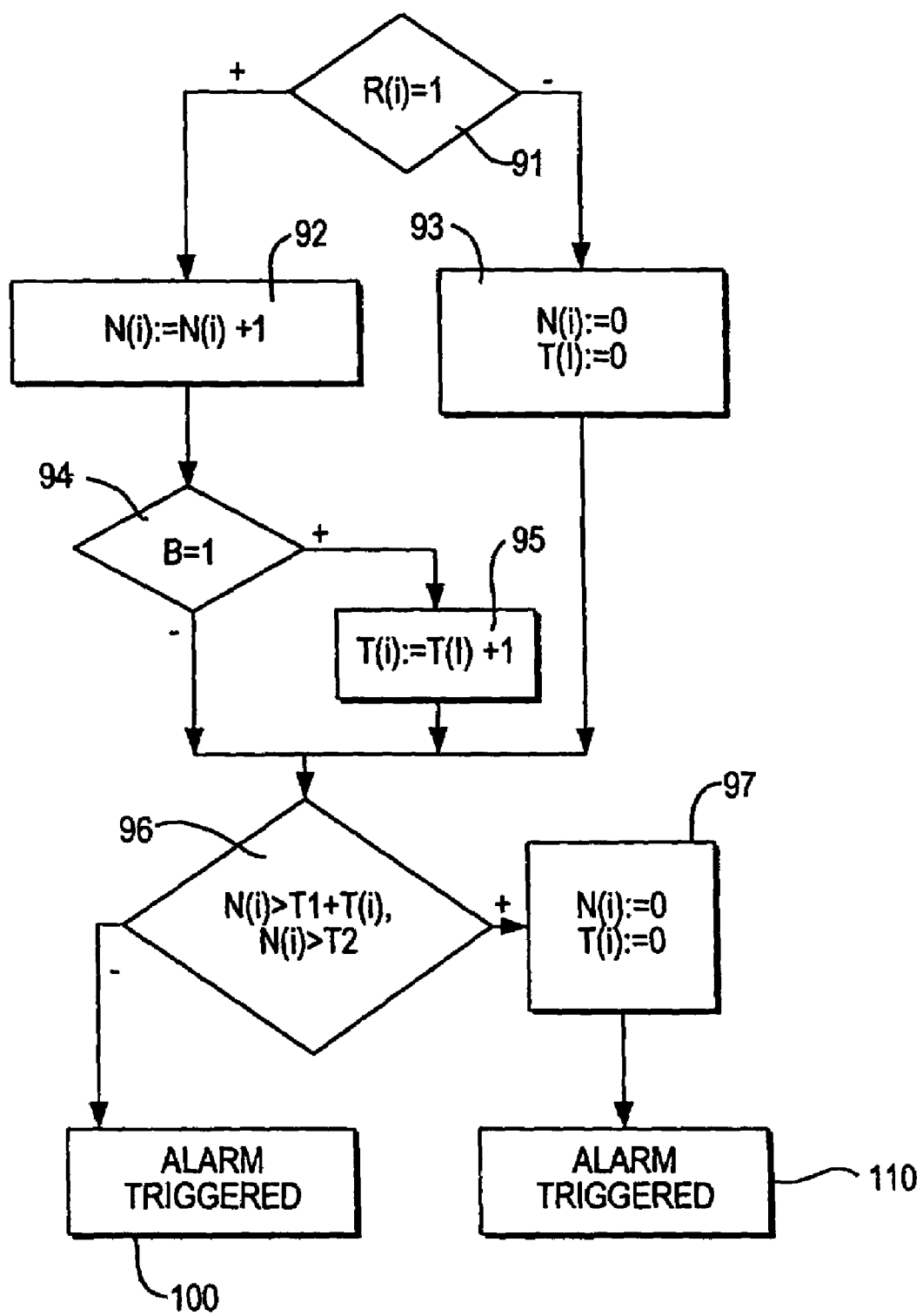
FIG. 4 shows a third flowchart for a method sequence for evaluating data obtained in the sequences according to FIG. 2 and FIG. 3.

FIG. 4 shows a method sequence for evaluating the data obtained in the sequences according to FIGS. 2 and 3. To this end, for each region R(i), a test is made as to whether the value=1 (step 91); if the answer is no, then a counter N(i) is set to zero (process step 93). A counter T(i) is also set to zero. If the answer is yes, then the counter N(i), which has the value 0 at the start of the process, is increased by 1 (process step 92). After process step 92, a test is made as to whether B=1 (process step 94). If B=1, then the counter T(i) is increased by 1 (process step 95). The counter T(i) in this instance is at 0 at the beginning of the process. In the negative case, after process step 94, after process step 95, and after process step 93, a query is made (query 96) as to whether N(i) is greater than T(i)+T1 or whether N(i) is greater than T2. If not, then no alarm is triggered. If yes, N(i) and T(i) are set to zero and an alarm 110 is triggered.

The aim of the above-described evaluation process is on the one hand, to detect changes in regions as early as possible but on the other hand, to permit global changes in the viewfield for greater time intervals. To that end, two time thresholds T1 and T2 are used. T2 here stands for the maximal time interval for which it is permissible for a region to be changed without an alarm being triggered. For example, T2 equals 15 minutes. T1 stands for the earliest time after which an alarm can be triggered with regard to a region, namely precisely when the overall image has been continuously identified as unchanged during this time. To this end, two counters per region are used: N(i) for indicating how often in direct chronological sequence a region has been identified as changed and T(i) for indicating the time at which a region was identified as "region changed" for the case in which the identification "overall image changed" has been made. By taking into account times in which the overall image has changed, changes which relate not only to the region, but also to the overall image do not result in the triggering of an alarm, unless the overall image has changed over a related time interval with the length T2 (in this regard, compare T2=15 min, which is selected to be greater than T1 at 20 sec., for example).

The invention claimed is:

1. A method of monitoring a predetermined scene to detect variations in the scene, said method comprising the steps of:
   a) establishing an edge image and a reference edge image based on a reference image and a current image detected in a view field of a stationary image capturing device;
   b) calculating a correlation value for at least one region of the edge image and a corresponding partial image of the reference edge image;
   c) identifying a change of the at least one region when the correlation value falls below a threshold value; and
   d) outputting an alarm signal when the at least one region is identified as changed for a predetermined time interval that is longer than a corresponding time interval that the edge image is detected to be changed, further comprising calculating an average quadratic deviation of said at least one region of the edge image and said corresponding partial image of the reference edge image when said correlation value exceeds said threshold value, so that possible brightness differences between said at least one region of the edge image and said corresponding partial image of the reference edge image are eliminated from the calculating;
   whereby deviations of said at least one region of the edge image from said corresponding partial image of the reference edge image that do not result from image noise and said brightness differences are distinguished.

2. The method as defined in claim 1, further comprising computing current image noise and storing said current image noise for subsequent image comparisons when none of said deviations that do not result from said image noise and said brightness differences are distinguished.

3. A monitoring system with a computer (2) for processing image data from a stationary image capturing device (1) that is aimed at a predetermined viewfield, characterized in that based on a reference image of the viewfield and a current image of the viewfield, the computer (2) establishes a reference edge image and an edge image, that the computer determines a correlation of at least one region of the edge image with a corresponding partial image of the reference edge image, and that when the correlation falls below a threshold, the computer registers the region as changed, and further characterized in that when the threshold is exceeded, the computer determines the difference of the region of the edge image from the corresponding partial image of the reference edge image, where a possible brightness difference between the reference edge image and the edge image is eliminated from the calculation so that by computing the image noise, a determination can be made as to whether there is a deviation of the region of the edge image from the corresponding partial image of the reference edge image that does not result from the image noise and the brightness difference.

4. The monitoring system according to claim 3, characterized in that the computer determines the correlation of the edge image with the reference edge image, that the computer is connected to a signal indicator (5) so that an alarm is output via the signal indicator (5) when the at least one region is detected as changed for a predetermined time (T1) longer than the edge image is detected as changed.

5. The monitoring system according to claim 4, characterized in that an alarm is output via the signal indicator (5) when the at least one region of the edge image is detected as changed for longer than an additional predetermined time (T2), where the additional predetermined time (T2) is greater than the predetermined time (T1).

6. The monitoring system according to claim 3, characterized in that the image capturing device is a video camera.

7. A monitoring system for monitoring a predetermined scene to detect variations in the scene, said monitoring system comprising
   means for generating a current image in a view field;
   means for establishing an edge image and a reference edge image based on a reference image and the current image detected in the view field;
   means for calculating a correlation value for at least one region of the edge image and a corresponding partial image of the reference edge image;
   means for identifying a change of the at least one region when the correlation value falls below a threshold value; and
   means for outputting an alarm signal when the at least one region is identified as changed for a predetermined time interval that is longer than a corresponding time interval that the edge image is detected to be changed;
wherein said means for generating said current image comprises a stationary image capturing device; said means for calculating said correlation value comprises a computer for processing image data and said computer includes means for testing whether or not said correlation value is above or below said threshold value in order to identify said change, further comprising means for calculating an average quadratic deviation of said at least one region of the edge image and said corresponding partial image of the reference edge image when said correlation value exceeds said threshold value, so that possible brightness differences between said at least one region of the edge image and said corresponding partial image of the reference edge image are eliminated from the calculating.

* * * * *